(12) United States Patent
Ehrlich

(10) Patent No.: US 12,321,691 B2
(45) Date of Patent: *Jun. 3, 2025

(54) AI-BASED METHOD AND SYSTEM FOR DRAFTING PATENT APPLICATIONS

(71) Applicant: Gal Ehrlich, Tel-Aviv (IL)

(72) Inventor: Gal Ehrlich, Tel-Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/610,353

(22) Filed: Mar. 20, 2024

(65) Prior Publication Data

US 2024/0220714 A1 Jul. 4, 2024

Related U.S. Application Data

(63) Continuation of application No. 18/092,153, filed on Dec. 30, 2022, now Pat. No. 11,966,688.

(51) Int. Cl.
*G06F 40/166* (2020.01)
*G06F 3/0484* (2022.01)
*G06F 40/123* (2020.01)
*G06Q 50/18* (2012.01)

(52) U.S. Cl.
CPC .......... *G06F 40/166* (2020.01); *G06F 3/0484* (2013.01); *G06F 40/123* (2020.01); *G06Q 50/184* (2013.01)

(58) Field of Classification Search
CPC .................................................. G06F 40/166
See application file for complete search history.

(56) References Cited

U.S. PATENT DOCUMENTS

| | | |
|---|---|---|
| 6,594,654 B1 | 7/2003 | Salam et al. |
| 10,276,170 B2 | 4/2019 | Gruber et al. |
| 2006/0116994 A1 | 6/2006 | Jonker et al. |
| 2007/0124166 A1 | 5/2007 | Van Luchene |
| 2012/0016678 A1 | 1/2012 | Gruber et al. |
| 2013/0275164 A1 | 10/2013 | Gruber et al. |
| 2017/0075877 A1 | 3/2017 | Lepeltier |
| 2018/0131645 A1 | 5/2018 | Magliozzi et al. |
| 2019/0188218 A1 | 6/2019 | Harris et al. |
| 2019/0354599 A1 | 11/2019 | Mital et al. |
| 2020/0019632 A1 | 1/2020 | Larchev et al. |
| 2020/0043112 A1 | 2/2020 | Brinkley, II |

(Continued)

OTHER PUBLICATIONS

Notice of Allowance Dated Jan. 4, 2024 from the US Patent and Trademark Office Re. U.S. Appl. No. 18/092,153. (6 pages).

(Continued)

*Primary Examiner* — James J Debrow

(57) ABSTRACT

A method and system for drafting a patent application. The method comprising (a) inputting a short description of an inventive concept into an AI machine; (b) querying the AI machine to draft one or more patent claims based on the short description; (c) inputting the drafted patent claims into a second query; and (d) requesting the second query to draft a patent application based on the drafted patent claims. The system comprising (a) an AI machine configured to receive a short description of an inventive concept and draft one or more patent claims based on the short description; (b) A second query interface configured to receive the drafted patent claims and draft a patent application based on the claims; and (c) a user interface through which a user can input the short description and receive the drafted patent application.

28 Claims, 2 Drawing Sheets

(56) References Cited

U.S. PATENT DOCUMENTS

| | | | |
|---|---|---|---|
| 2020/0151393 A1 | 5/2020 | Schick et al. | |
| 2020/0242144 A1 | 7/2020 | Yoshida et al. | |
| 2020/0356902 A1 | 11/2020 | Beers et al. | |
| 2021/0136222 A1 | 5/2021 | Brown et al. | |
| 2021/0141799 A1 | 5/2021 | Steedman Henderson | |
| 2021/0150155 A1 | 5/2021 | Kim et al. | |
| 2021/0232759 A1* | 7/2021 | Schick et al. | G06F 40/166 |
| 2022/0232126 A1 | 7/2022 | Naidu et al. | |
| 2023/0063363 A1 | 3/2023 | Zuniga et al. | |
| 2023/0252224 A1 | 8/2023 | Tran | |
| 2023/0252225 A1* | 8/2023 | Tran | G06F 40/151 |

OTHER PUBLICATIONS

Official Action Dated May 5, 2023 from the US Patent and Trademark Office Re. U.S. Appl. No. 18/092,153. (6 pages).

Official Action Dated Sep. 7, 2023 from the US Patent and Trademark Office Re. U.S. Appl. No. 18/092,153. (10 pages).

International Search Report and the Written Opinion Dated Jul. 10, 2024 From the International Searching Authority Re. Application No. PCT/IL2024/050362. (9 Pages).

Advisory Action Before the Filing of an Appeal Brief Dated Oct. 27, 2023 from US Patent and Trademark Office Re. U.S. Appl. No. 18/092,143. (4 pages).

Official Action Dated Mar. 3, 2023 from the US Patent and Trademark Office Re. U.S. Appl. No. 18/092,143. (16 pages).

Official Action Dated Jul. 21, 2023 from the US Patent and Trademark Office Re. U.S. Appl. No. 18/092,143. (22 pages).

Official Action Dated Jan. 13, 2025 from the US Patent and Trademark Office Re. U.S. Appl. No. 18/092,143. (28 pages).

Official Action Dated Oct. 24, 2024 From the US Patent and Trademark Office Re. U.S. Appl. No. 18/665,707. (27 Pages).

\* cited by examiner

AI-BASED METHOD AND SYSTEM FOR DRAFTING PATENT APPLICATIONS

RELATED APPLICATION

This application is a continuation of U.S. patent application Ser. No. 18/092,153 filed on Dec. 30, 2022, the contents of which are incorporated herein by reference in their entirety.

FIELD OF THE INVENTION

This invention relates to the field of patent drafting and specifically to the use of artificial intelligence to assist in the drafting of patent applications.

BACKGROUND OF THE INVENTION

Patent drafting is a complex and time-consuming process that requires significant expertise and attention to detail. It involves identifying the inventive concept, formulating one or more patent claims that define the scope of the invention, and preparing a detailed description of the invention in a patent application. The process is further complicated by the need to ensure that the patent claims meet all necessary legal requirements, such as novelty, non-obviousness, and enablement.

SUMMARY OF THE INVENTION

The present invention provides a method and system for drafting patent applications using artificial intelligence. The method includes inputting a short description of an inventive concept into an AI machine, querying the AI machine to draft one or more patent claims based on the short description, and inputting the drafted patent claims into a second query to draft a patent application based on the claims. The system includes an AI machine configured to receive a short description of an inventive concept and draft one or more patent claims based on the short description, A second query interface configured to receive the drafted patent claims and draft a patent application based on the claims, and a user interface through which a user can input the short description and receive the drafted patent application.

The preferred embodiment described in the text involves using artificial intelligence (AI) to draft a patent application. The process includes inputting a short description of an inventive concept into an AI machine, which then drafts one or more patent claims based on the description.

The drafted claims are then input into a second query, which can be another AI machine or a software program, to draft the full patent application. The system for this process includes an AI machine for drafting the claims, a second query for drafting the application, a user interface for inputting the short description and receiving the drafted application, a database for storing the relevant information, and a server to access the database and execute the steps of the method. The process and system may also include additional features, such as inputting guidelines for drafting the claims and application, inputting additional information about the inventive concept, storing the information in a memory and accessing it with a processor, connecting the AI machine and the second query through a network, implementing the AI machine and the second query as software programs, including independent and dependent claims in the drafted claims, drafting the application in a specific format, and providing the option for manual review and modification of the claims and application. Additionally, the system may allow for the input of constraints or limitations for the claims and the input of information about the intended market, use, and benefits of the invention to tailor the claims and application to the specific needs of the user.

Hence according to the invention there is provided a method for drafting a patent application comprising: (a) inputting a short description of an inventive concept into an AI machine; (b) querying the AI machine to draft one or more patent claims based on the short description; (c) inputting the drafted patent claims into a second query; and (d) requesting the second query to draft a patent application based on the drafted patent claims.

Further according to the invention there is provided a system for drafting a patent application comprising: (a) an AI machine configured to receive a short description of an inventive concept and draft one or more patent claims based on the short description; (b) A second query interface configured to receive the drafted patent claims and draft a patent application based on the claims; and (c) a user interface through which a user can input the short description and receive the drafted patent application.

The method may further comprise (a) reviewing the drafted patent application to ensure that it meets all necessary legal requirements; and (b) modifying the drafted patent application as necessary based on the review.

The system may further comprise a database for storing the short description, the drafted patent claims, and the drafted patent application; and (b) a server for accessing the database and executing the steps of the method.

According to some preferred embodiments the short description includes one or more keywords identifying the inventive concept.

According to some preferred embodiments the short description includes a summary of the inventive concept.

According to some preferred embodiments the short description includes a description of one or more features of the inventive concept.

According to some preferred embodiments the AI machine is trained on a dataset of previously drafted patent claims.

According to some preferred embodiments the AI machine and the second query are connected through a network.

According to some preferred embodiments the AI machine and the second query are implemented as software programs executing on a computer.

According to some preferred embodiments the drafted patent claims include one or more independent claims and one or more dependent claims.

According to some preferred embodiments the method further comprising: (a) inputting a set of guidelines for drafting the patent claims into the AI machine; and (b) using the set of guidelines to guide the drafting of the patent claims by the AI machine.

According to some preferred embodiments the system, further comprising: (a) a set of guidelines for drafting the patent claims, stored in a memory; and (b) a processor for accessing the set of guidelines and using them to guide the drafting of the patent claims by the AI machine.

According to some preferred embodiments the method further comprising: (a) inputting a set of guidelines for drafting the patent application into the second query; and (b) using the set of guidelines to guide the drafting of the patent application by the second query.

According to some preferred embodiments the system further comprising: (a) a set of guidelines for drafting the patent application, stored in a memory; and (b) a processor for accessing the set of guidelines and using them to guide the drafting of the patent application by the second query.

According to some preferred embodiments the method further comprising: (a) inputting additional information about the inventive concept into the AI machine; and (b) using the additional information to refine the drafted patent claims.

According to some preferred embodiments the system further comprising: (a) a user interface for inputting additional information about the inventive concept; and (b) a processor for using the additional information to refine the drafted patent claims.

According to some preferred embodiments the method further comprising: (a) inputting a set of preferred language for drafting the patent claims into the AI machine; and (b) using the set of preferred language to guide the drafting of the patent claims by the AI machine.

According to some preferred embodiments the system further comprising: (a) a set of preferred language for drafting the patent claims, stored in a memory; and (b) a processor for accessing the set of preferred language and using it to guide the drafting of the patent claims by the AI machine.

According to some preferred embodiments the method further comprising: (a) inputting a set of preferred language for drafting the patent application into the second query; and (b) using the set of preferred language to guide the drafting of the patent application by the second query.

According to some preferred embodiments the system further comprising: (a) a set of preferred language for drafting the patent application, stored in a memory; and (b) a processor for accessing the set of preferred language and using it to guide the drafting of the patent application by the second query.

According to some preferred embodiments the method further comprising: (a) inputting a set of formatting guidelines for the patent application into the second query; and (b) using the set of formatting guidelines to format the patent application.

According to some preferred embodiments the system further comprising: (a) a set of formatting guidelines for the patent application, stored in a memory; and (b) a processor for accessing the set of formatting guidelines and using them to format the patent application.

According to some preferred embodiments the method of claim further comprising: (a) inputting a set of drawings or diagrams illustrating the inventive concept into the second query; and (b) including the set of drawings or diagrams in the patent application.

According to some preferred embodiments the system further comprising: (a) a database of drawings or diagrams illustrating the inventive concept, stored in a memory; and (b) a processor for accessing the database of drawings or diagrams and including them in the patent application.

According to some preferred embodiments the method further comprising: (a) inputting a set of references supporting the patent claims and description of the inventive concept into the second query; and (b) including the set of references in the patent application.

According to some preferred embodiments the system of claim further comprising: (a) a database of references supporting the patent claims and description of the inventive concept, stored in a memory; and (b) a processor for accessing the database of references and including them in the patent application.

According to some preferred embodiments the method further comprising: (a) inputting a set of instructions for the AI machine into the second query; and (b) using the set of instructions to guide the operation of the AI machine.

According to some preferred embodiments the system further comprising: (a) a set of instructions for the AI machine, stored in a memory; and (b) a processor for accessing the set of instructions and using them to guide the operation of the AI machine.

According to some preferred embodiments the system further comprising: (a) a processor for executing the steps of the method and controlling the operation of the system; and (b) a memory for storing the short description, the drafted patent claims, the drafted patent application, and any other necessary data or instructions.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
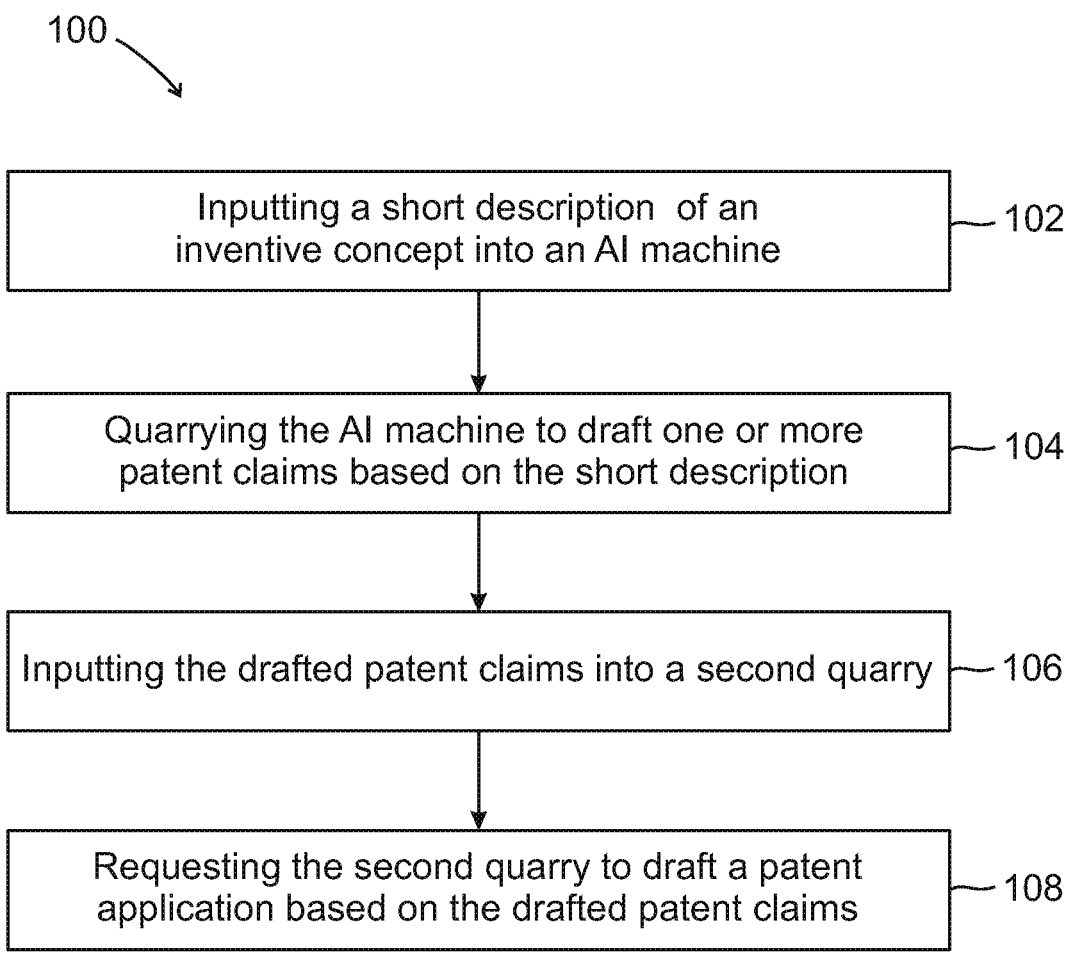
FIG. 1 shows a flowchart of the method for drafting a patent application using artificial intelligence.

With reference to the drawings, FIG. 1 depicts a method 100 for drafting a patent application comprising: (a) inputting a short description of an inventive concept into an AI machine (step 102); (b) querying the AI machine to draft one or more patent claims based on the short description (step 104); (c) inputting the drafted patent claims into a second query (step 106); and (d) requesting the second query to draft a patent application based on the drafted patent claims (step 108).

Figure 2:
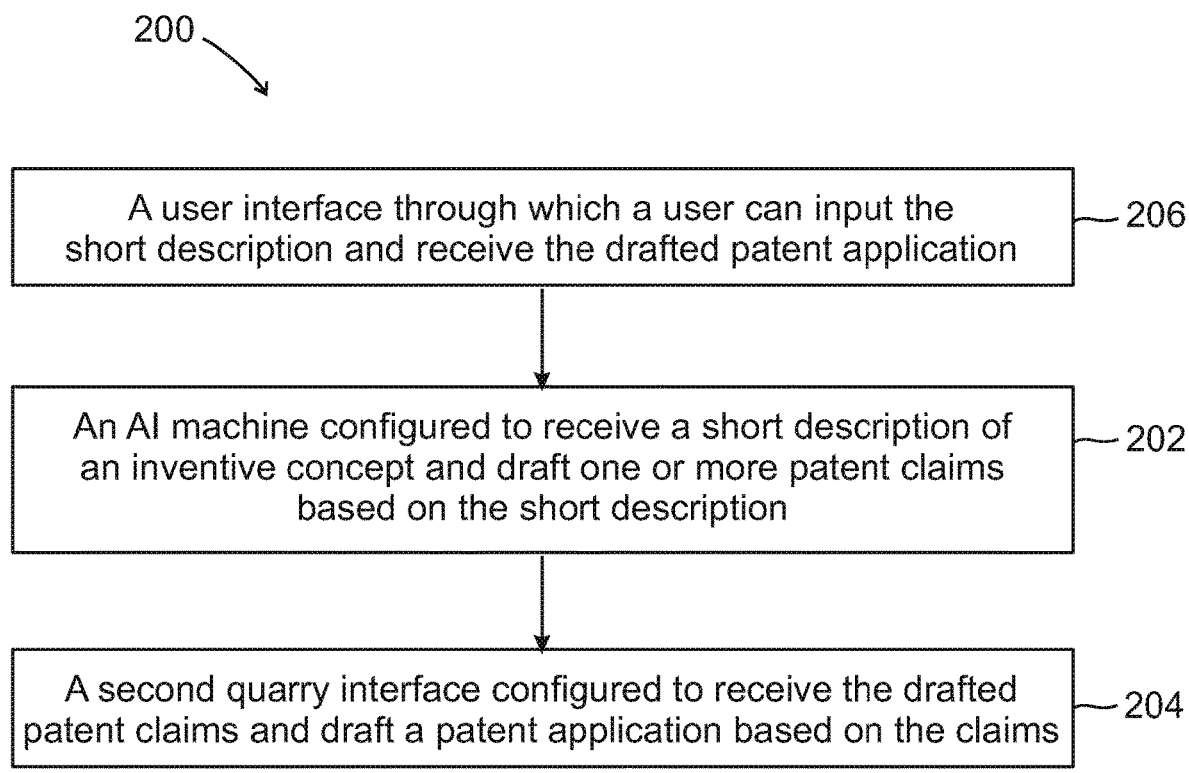
FIG. 2 shows a block diagram of the system for drafting a patent application using artificial intelligence.

FIG. 2 depicts a system 200 for drafting a patent application comprising: (a) an AI machine configured to receive a short description of an inventive concept and draft one or more patent claims based on the short description (box 202); (b) A second query interface configured to receive the drafted patent claims and draft a patent application based on the claims (box 204); and (c) a user interface through which a user can input the short description and receive the drafted patent application (Box 206).

In a preferred embodiment, the method for drafting a patent application using artificial intelligence includes the following steps:

Inputting a short description of an inventive concept into an AI machine. The short description may include one or more keywords identifying the inventive concept, a summary of the inventive concept, or a description of one or more features of the inventive concept.

Querying the AI machine to draft one or more patent claims based on the short description. The AI machine may be trained on a dataset of previously drafted patent claims to assist in the drafting process.

Inputting the drafted patent claims into a second query. The second query may be a separate AI machine or a software program executing on a computer.

Requesting the second query to draft a patent application based on the drafted patent claims.

Reviewing the drafted patent application to ensure that it meets all necessary legal requirements, and modifying the drafted patent application as necessary based on the review.

In a preferred embodiment, the system for drafting a patent application using artificial intelligence includes the following components:

An AI machine configured to receive a short description of an inventive concept and draft one or more patent claims based on the short description. The AI machine may be trained on a dataset of previously drafted patent claims to assist in the drafting process.

A second query interface configured to receive the drafted patent claims and draft a patent application based on the claims. The second query may be a separate AI machine or a software program executing on a computer.

A user interface through which a user can input the short description and receive the drafted patent application.

A database for storing the short description, the drafted patent claims, and the drafted patent application.

A server for accessing the database and executing the steps of the method.

In other preferred embodiments, the method and system may include additional features, such as:

Inputting a set of guidelines for drafting the patent claims into the AI machine, and using the guidelines to guide the drafting of the patent claims by the AI machine. Inputting a set of guidelines for drafting the patent application into the second query, and using the guidelines to guide the drafting of the patent application by the second query.

Inputting additional information about the inventive concept into the AI machine, and using the additional information to refine the drafted patent claims. Inputting a set of preferred language for drafting the patent claims into the AI machine, and using the preferred language to guide the drafting of the patent claims by the AI machine.

Storing the short description, the drafted patent claims, and the drafted patent application in a memory and accessing the stored information using a processor.

Connecting the AI machine and the second query through a network.

Implementing the AI machine and the second query as software programs executing on a computer.

Including one or more independent claims and one or more dependent claims in the drafted patent claims.

Drafting the patent application in a specific format, such as the format used by the United States Patent and Trademark Office or the format used by a foreign patent office.

Providing a user with the option to manually review and modify the drafted patent claims and patent application before finalizing the patent application.

Providing a user with the option to input a set of constraints or limitations for the patent claims, such as a requirement that the claims be novel and non-obvious.

Providing a user with the option to input information about the intended market for the invention, the intended use of the invention, or the intended benefits of the invention, and using this information to tailor the drafted patent claims and patent application to the specific needs of the user.

It will be appreciated that the above-described method and system are merely examples, and that various modifications and improvements can be made without departing from the scope of the invention. The invention is intended to cover all such modifications and improvements.

It is contemplated that the method and system of the present invention may be implemented in a variety of ways. For example, the AI machine and the second query may be implemented as standalone software programs or as part of a larger software platform. The AI machine and the second query may also be implemented as cloud-based services, allowing users to access the drafting process remotely via the internet.

The user interface may be implemented as a web-based application, allowing users to access the drafting process from any device with an internet connection. Alternatively, the user interface may be implemented as a desktop application or a mobile application, providing users with the ability to access the drafting process from a specific device or devices.

The database and server may be implemented as part of a larger data management system, allowing users to store and retrieve information related to the drafting process. The database may also be implemented as a cloud-based service, allowing users to access and update their information from any device with an internet connection.

It is also contemplated that the method and system of the present invention may be used in conjunction with other tools and resources to assist in the drafting process. For example, users may input information about the intended market for the invention, the intended use of the invention, or the intended benefits of the invention, and the AI machine and the second query may use this information to tailor the drafted patent claims and patent application to the specific needs of the user. Users may also input a set of constraints or limitations for the patent claims, such as a requirement that the claims be novel and non-obvious, and the AI machine and the second query may use these constraints to guide the drafting process.

Overall, the present invention provides a powerful tool for streamlining the patent drafting process, allowing users to quickly and efficiently draft high-quality patent applications with minimal effort. By leveraging the power of artificial intelligence, the present invention enables users to focus on the creative aspects of the patent drafting process, while leaving the technical details to the AI machine and the second query.

It is contemplated that the method and system of the present invention may be used by a variety of users, including inventors, patent attorneys, and patent agents. Inventors may use the present invention to quickly and easily draft patent applications for their own inventions, without the need for extensive knowledge of patent law or the drafting process. Patent attorneys and patent agents may use the present invention as a tool to assist in the drafting of patent applications for their clients, allowing them to more efficiently and effectively handle the volume of work in their practice.

The present invention may also be used by companies and organizations that have a significant number of patent applications to draft. By using the present invention, these organizations can significantly reduce the time and effort required to draft patent applications, allowing them to focus on other important aspects of their business.

It is further contemplated that the method and system of the present invention may be used in a variety of industries, including the technology, pharmaceutical, and manufacturing industries. The present invention may be particularly useful for companies operating in these industries, as these industries often rely heavily on patent protection to protect their intellectual property.

Overall, the present invention represents a significant advancement in the field of patent drafting, offering a powerful and efficient tool for drafting high-quality patent applications. By leveraging the power of artificial intelligence, the present invention allows users to focus on the creative aspects of the patent drafting process, while leaving the technical details to the AI machine and the second query.

It is contemplated that the method and system of the present invention may be used in a variety of countries and jurisdictions around the world. The AI machine and the second query may be configured to draft patent applications in accordance with the specific requirements of different countries and jurisdictions, allowing users to easily prepare patent applications for filing in multiple countries.

In addition, the present invention may be used in conjunction with other tools and resources to assist in the patent filing process. For example, users may use the present invention to draft a provisional patent application, which allows them to establish an early effective filing date for their invention. Users may then use the drafted provisional patent application as a starting point for preparing a non-provisional patent application, which can be filed with the appropriate patent office to seek full patent protection for their invention.

It is also contemplated that the present invention may be used to draft other types of patent-related documents, such as responses to office actions from the patent office or amendments to pending patent applications. By using the present invention, users can quickly and easily prepare these documents, ensuring that they are properly drafted and in compliance with all necessary legal requirements.

Overall, the present invention represents a valuable resource for anyone involved in the patent process, offering a powerful and efficient tool for drafting high-quality patent applications and related documents. By leveraging the power of artificial intelligence, the present invention allows users to focus on the creative aspects of the patent process, while leaving the technical details to the AI machine and the second query.

It is contemplated that the method and system of the present invention may be implemented using a variety of software and hardware platforms. For example, the AI machine and the second query may be implemented as standalone software programs running on a computer or as part of a larger software platform. The AI machine and the second query may also be implemented as cloud-based services, allowing users to access the drafting process remotely via the internet.

The user interface may be implemented as a web-based application, allowing users to access the drafting process from any device with an internet connection. Alternatively, the user interface may be implemented as a desktop application or a mobile application, providing users with the ability to access the drafting process from a specific device or devices.

The database and server may be implemented using a variety of database management systems and server software, such as MySQL, Oracle, or Microsoft SQL Server. The database and server may also be implemented as cloud-based services, allowing users to store and retrieve information related to the drafting process from any device with an internet connection.

It is also contemplated that the present invention may be implemented using a variety of hardware platforms, including personal computers, servers, and cloud-based computing platforms. The specific hardware platform used may depend on the specific needs and requirements of the user, as well as the scale of the drafting process.

Overall, the present invention represents a significant advancement in the field of patent drafting, offering a powerful and efficient tool for drafting high-quality patent applications. By leveraging the power of artificial intelligence, the present invention allows users to focus on the creative aspects of the patent drafting process, while leaving the technical details to the AI machine and the second query.

It is contemplated that the method and system of the present invention may be used in a variety of industries, including the technology, pharmaceutical, and manufacturing industries. The present invention may be particularly useful for companies operating in these industries, as these industries often rely heavily on patent protection to protect their intellectual property.

For example, the technology industry is constantly innovating and introducing new products and services, and patents play a critical role in protecting these innovations. By using the present invention, technology companies can quickly and easily draft patent applications for their inventions, ensuring that they are properly protected and can effectively defend their intellectual property.

Similarly, the pharmaceutical industry is highly competitive, and patents are essential for protecting new drugs and therapies. By using the present invention, pharmaceutical companies can efficiently draft patent applications for their new drugs and therapies, enabling them to bring these innovations to market more quickly and effectively.

The manufacturing industry also relies heavily on patents to protect its innovations and competitive advantage. By using the present invention, manufacturing companies can quickly and easily draft patent applications for their inventions, ensuring that they are properly protected and can effectively defend their intellectual property.

Overall, the present invention represents a valuable resource for companies and organizations operating in a variety of industries, offering a powerful and efficient tool for drafting high-quality patent applications and protecting their intellectual property. By leveraging the power of artificial intelligence, the present invention allows users to focus on the creative aspects of the patent process, while leaving the technical details to the AI machine and the second query.

It is contemplated that the method and system of the present invention may be used to draft a variety of different types of patent applications, including utility patents, design patents, and plant patents.

Utility patents are the most common type of patent and cover new and useful inventions or discoveries, including products, processes, and machines. By using the present invention, users can quickly and easily draft utility patent applications for their inventions, ensuring that they are properly protected and can effectively defend their intellectual property.

Design patents cover new, original, and ornamental designs for an article of manufacture. By using the present invention, users can efficiently draft design patent applications for their inventions, protecting the unique visual features of their products. Plant patents cover new varieties of plants that have been asexually reproduced. By using the present invention, users can efficiently draft plant patent applications for their new plant varieties, ensuring that they are properly protected and can effectively defend their intellectual property.

Overall, the present invention represents a powerful and efficient tool for drafting a wide range of patent applications, covering a variety of different types of inventions and discoveries. By leveraging the power of artificial intelligence, the present invention allows users to focus on the creative aspects of the patent process, while leaving the technical details to the AI machine and the second query.

It is contemplated that the method and system of the present invention may be used to draft patent applications for filing in a variety of different countries and jurisdictions around the world. The AI machine and the second query may be configured to draft patent applications in accordance with the specific requirements of different countries and jurisdictions, allowing users to easily prepare patent applications for filing in multiple countries.

For example, users may use the present invention to draft a patent application for filing in the United States, which is known for having a robust and well-developed patent system. The United States Patent and Trademark Office (USPTO) is responsible for granting patents in the United States, and users may use the present invention to draft a patent application that complies with the requirements of the USPTO.

Users may also use the present invention to draft a patent application for filing in a foreign country, such as Canada, Japan, or Europe. Each country has its own patent office and specific requirements for patent applications, and users may use the present invention to ensure that their patent application complies with the requirements of the relevant foreign patent office.

Overall, the present invention represents a powerful and efficient tool for drafting patent applications for filing in a variety of different countries and jurisdictions around the world. By leveraging the power of artificial intelligence, the present invention allows users to focus on the creative aspects of the patent process, while leaving the technical details to the AI machine and the second query.

It is contemplated that the method and system of the present invention may be used in conjunction with other tools and resources to assist in the patent process. For example, users may use the present invention to draft a provisional patent application, which allows them to establish an early effective filing date for their invention. A provisional patent application is a temporary patent application that does not undergo substantive examination by the patent office, but it does establish an early effective filing date for the invention.

Users may then use the drafted provisional patent application as a starting point for preparing a non-provisional patent application, which can be filed with the appropriate patent office to seek full patent protection for their invention. The non-provisional patent application will undergo substantive examination by the patent office, and if it meets all the necessary requirements, a patent will be granted to the applicant.

Users may also use the present invention to draft other types of patent-related documents, such as responses to office actions from the patent office or amendments to pending patent applications. By using the present invention, users can quickly and easily prepare these documents, ensuring that they are properly drafted and in compliance with all necessary legal requirements.

Overall, the present invention represents a valuable resource for anyone involved in the patent process, offering a powerful and efficient tool for drafting high-quality patent applications and related documents. By leveraging the power of artificial intelligence, the present invention allows users to focus on the creative aspects of the patent process, while leaving the technical details to the AI machine and the second query.

It is contemplated that the method and system of the present invention may be used to draft patent applications for a wide range of different types of inventions and discoveries. The AI machine and the second query may be trained on a dataset of previously drafted patent claims, allowing them to understand the technical and legal requirements for drafting patent applications in a variety of different fields.

For example, users may use the present invention to draft patent applications for inventions in the technology field, such as new software applications, computer hardware, or mobile devices. The AI machine and the second query may be trained on a dataset of previously drafted patent claims related to technology inventions, allowing them to understand the specific requirements for drafting patent applications in this field.

Users may also use the present invention to draft patent applications for inventions in the pharmaceutical field, such as new drugs or therapies. The AI machine and the second query may be trained on a dataset of previously drafted patent claims related to pharmaceutical inventions, allowing them to understand the specific requirements for drafting patent applications in this field.

Similarly, users may use the present invention to draft patent applications for inventions in the manufacturing field, such as new products or processes. The AI machine and the second query may be trained on a dataset of previously drafted patent claims related to manufacturing inventions, allowing them to understand the specific requirements for drafting patent applications in this field.

Overall, the present invention represents a powerful and efficient tool for drafting patent applications for a wide range of different types of inventions and discoveries. By leveraging the power of artificial intelligence, the present invention allows users to focus on the creative aspects of the patent process, while leaving the technical details to the AI machine and the second query.

It is contemplated that the method and system of the present invention may be used to draft a variety of different types of patent claims, including independent claims and dependent claims.

Independent claims define the scope of the invention and stand on their own, without relying on any other claims. These claims are typically drafted in a broad manner, covering the broadest possible scope of the invention. By using the present invention, users can quickly and easily draft independent claims that define the scope of their invention in a clear and concise manner.

Dependent claims are claims that refer back to an independent claim and provide additional detail or limitation on the scope of the invention. These claims are typically drafted in a narrower manner, limiting the scope of the invention in some way. By using the present invention, users can efficiently draft dependent claims that provide additional detail or limitation on the scope of their invention.

It is contemplated that the present invention may be used to draft both independent claims and dependent claims, allowing users to fully define the scope of their invention and properly protect their intellectual property. By leveraging the power of artificial intelligence, the present invention allows users to focus on the creative aspects of the patent process, while leaving the technical details to the AI machine and the second query.

It is contemplated that the method and system of the present invention may be used to draft patent applications in a variety of different languages. The AI machine and the second query may be configured to draft patent applications in multiple languages, allowing users to easily prepare patent applications for filing in different countries and jurisdictions around the world.

For example, users may use the present invention to draft a patent application in English, which is the most commonly used language for drafting patent applications. English is used as the official language of the patent offices in many countries around the world, including the United States, Canada, and Europe.

Users may also use the present invention to draft a patent application in a foreign language, such as French, German, or Japanese. Each country has its own patent office and specific requirements for patent applications, and users may use the present invention to ensure that their patent application is properly drafted and in compliance with the requirements of the relevant foreign patent office.

Overall, the present invention represents a powerful and efficient tool for drafting patent applications in a variety of different languages, allowing users to easily prepare patent applications for filing in different countries and jurisdictions around the world. By leveraging the power of artificial intelligence, the present invention allows users to focus on the creative aspects of the patent process, while leaving the technical details to the AI machine and the second query.

It is contemplated that the method and system of the present invention may be used to draft patent applications with a variety of different levels of detail and complexity. The AI machine and the second query may be configured to draft patent applications with a wide range of different levels of detail, allowing users to tailor the drafting process to their specific needs and requirements.

For example, users may use the present invention to draft a simple patent application that covers the broadest possible scope of their invention. This type of patent application may be useful for quickly establishing an early effective filing date for the invention or for obtaining a basic level of protection for the invention.

Users may also use the present invention to draft a more detailed patent application that provides a more comprehensive description of the invention and its features. This type of patent application may be useful for seeking more robust protection for the invention or for defending the invention against potential challenges from third parties.

It is contemplated that the present invention may be used to draft patent applications with a variety of different levels of detail and complexity, allowing users to tailor the drafting process to their specific needs and requirements. By leveraging the power of artificial intelligence, the present invention allows users to focus on the creative aspects of the patent process, while leaving the technical details to the AI machine and the second query.

The use of the terms "a" and "an" and "the" and similar referents in the context of describing the invention (especially in the context of the following claims) are to be construed to cover both the singular and the plural, unless otherwise indicated herein or clearly contradicted by context. The use of the term "at least one" before a list of one or more items (for example, "at least one of A and B") means that the list is not exclusive and that any combination of two or more of the listed items may be used.

The word "exemplary" is used herein to mean "serving as an example, instance, or illustration." Any embodiment described as "exemplary" is not necessarily to be construed as preferred or advantageous over other embodiments.

The present invention has been described with reference to particular embodiments and examples, but it will be understood by those skilled in the art that the invention is not limited to the embodiments or examples described. The scope of the invention is defined by the appended claims and their equivalents, rather than by the foregoing description.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b) to allow the reader to quickly ascertain the nature of the technical disclosure. It is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

It will be understood that the present invention may be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

It will be understood that although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

The terms "comprises", "comprising", "includes", "including", "having" and their conjugates mean "including but not limited to".

The term "consisting of" means "including and limited to".

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

It should be noted that the figures are only intended to facilitate the description of the preferred embodiments of the present invention. The figures do not describe every aspect of the present invention and do not limit the scope of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

It is intended that the following claims be interpreted to embrace all the features of the invention disclosed herein, and all statements that are within the scope of the claims, and be given their broadest interpretation in view of the prior art. It is intended that the following claims be interpreted to embrace all the features of the invention disclosed herein, and all statements that are within the scope of the claims, and be given their broadest interpretation in view of the prior art.

What is claimed is:

1. A method for improving an efficiency and a performance of a system for drafting a patent application by utilizing an Artificial Intelligence (AI) machine, comprising: (a) inputting, through a user interface, a short description of an inventive concept into an AI machine; (b) requesting through said user interface the AI machine to draft one or more patent claims based on the short description; and requesting said AI machine, through said user interface, to draft a patent application based on the drafted patent claims and receiving, through said user interface, a drafted patent application drafted by said AI machine.

2. A system with improved efficiency and performance in drafting a patent application by utilizing Artificial Intelligence (AI) machine, comprising: (a) an AI machine configured to receive a short description of an inventive concept, to draft one or more patent claims based on the short description and to draft a patent application based on the one or more drafted patent claims; and (b) a user interface through which a user can input the short description, request the AI machine to draft the one of more patent claims, request the AI machine to draft the patent application and receive the drafted patent application drafted by said AI machine.

3. The method of claim 1, further comprising: (a) reviewing the drafted patent application to ensure that it meets all necessary legal requirements; and (b) modifying the drafted patent application as necessary based on the review.

4. The system of claim 2, further comprising: (a) a database for storing the short description, the drafted patent claims, and the drafted patent application; and (b) a server for accessing the database and executing the steps of the method.

5. The method of claim 1, wherein the short description includes one or more keywords identifying the inventive concept.

6. The method of claim 1, wherein the short description includes a summary of the inventive concept.

7. The method of claim 1, wherein the short description includes a description of one or more features of the inventive concept.

8. The method of claim 1, wherein the AI machine is trained on a dataset of previously drafted patent claims.

9. The system of claim 2, wherein the AI machine is implemented as software programs executing on a computer.

10. The method of claim 1, wherein the drafted patent claims include one or more independent claims and one or more dependent claims.

11. The method of claim 1, further comprising: (a) inputting a set of guidelines for drafting the patent claims into the AI machine; and (b) using the set of guidelines to guide the drafting of the patent claims by the AI machine.

12. The system of claim 2, further comprising: (a) a set of guidelines for drafting the patent claims, stored in a memory; and (b) a processor for accessing the set of guidelines and using them to guide the drafting of the patent claims by the AI machine.

13. The method of claim 1, further comprising: (a) inputting a set of guidelines for drafting the patent application into the AI machine; and (b) using the set of guidelines to guide the drafting of the patent application by the AI machine.

14. The system of claim 2, further comprising: (a) a set of guidelines for drafting the patent application, stored in a memory; and (b) a processor for accessing the set of guidelines and using them to guide the drafting of the patent application by the AI machine.

15. The method of claim 1, further comprising: (a) inputting additional information about the inventive concept into the AI machine; and (b) using the additional information to refine the drafted patent claims.

16. The system of claim 2, further comprising: (a) a user interface for inputting additional information about the inventive concept; and (b) a processor for using the additional information to refine the drafted patent claims.

17. The method of claim 1, further comprising: (a) inputting a set of preferred language for drafting the patent claims into the AI machine; and (b) using the set of preferred language to guide the drafting of the patent claims by the AI machine.

18. The system of claim 2, further comprising: (a) a set of preferred language for drafting the patent claims, stored in a memory; and (b) a processor for accessing the set of preferred language and using it to guide the drafting of the patent claims by the AI machine.

19. The method of claim 1, further comprising: (a) inputting a set of preferred language for drafting the patent application into the AI machine; and (b) using the set of preferred language to guide the drafting of the patent application by the AI machine.

20. The system of claim 2, further comprising: (a) a set of preferred language for drafting the patent application, stored in a memory; and (b) a processor for accessing the set of preferred language and using it to guide the drafting of the patent application by the AI machine.

21. The method of claim 1, further comprising: (a) inputting a set of formatting guidelines for the patent application into the AI machine; and (b) using the set of formatting guidelines to format the patent application.

22. The system of claim 2, further comprising: (a) a set of formatting guidelines for the patent application, stored in a memory; and (b) a processor for accessing the set of formatting guidelines and using them to format the patent application.

23. The method of claim 1, further comprising: (a) inputting a set of drawings or diagrams illustrating the inventive concept into the AI machine; and (b) including the set of drawings or diagrams in the patent application.

24. The system of claim 2, further comprising: (a) a database of drawings or diagrams illustrating the inventive concept, stored in a memory; and (b) a processor for accessing the database of drawings or diagrams and including them in the patent application.

25. The method of claim 1, further comprising: (a) inputting a set of references supporting the patent claims and description of the inventive concept into the AI machine; and (b) including the set of references in the patent application.

26. The system of claim 2, further comprising: (a) a database of references supporting the patent claims and description of the inventive concept, stored in a memory; and (b) a processor for accessing the database of references and including them in the patent application.

27. The system of claim 2, further comprising: (a) a set of instructions for the AI machine, stored in a memory; and (b)

a processor for accessing the set of instructions and using them to guide the operation of the AI machine.

28. The system of claim 2, further comprising: (a) a processor for executing the steps of the method and controlling the operation of the system; and (b) a memory for storing the short description, the drafted patent claims, the drafted patent application, and any other necessary data or instructions.

\* \* \* \* \*